July 11, 1944.  C. ADLER, JR  2,353,380
AIRCRAFT PRECISION FLIGHT INDICATOR
Filed Jan. 18, 1944  2 Sheets-Sheet 1
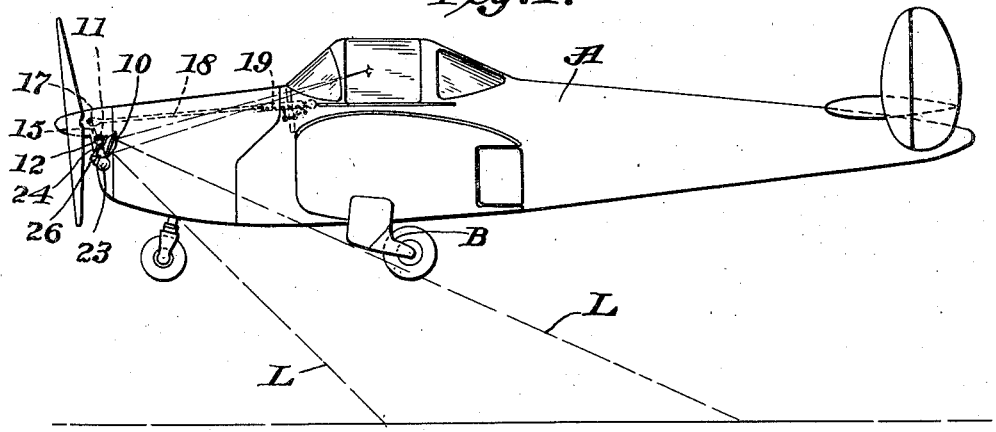
Fig. 1.
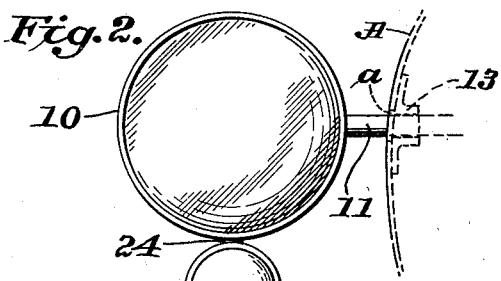
Fig. 2.
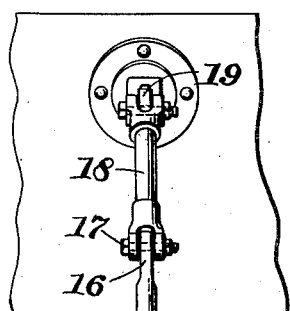
Fig. 3.
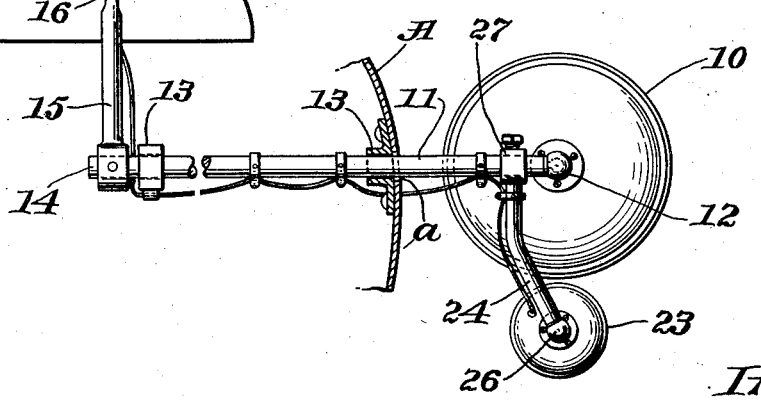
Inventor:
Charles Adler, Jr.,
By Cushman Darby and Cushman
Attorneys.

July 11, 1944.   C. ADLER, JR   2,353,380
AIRCRAFT PRECISION FLIGHT INDICATOR
Filed Jan. 18, 1944   2 Sheets-Sheet 2
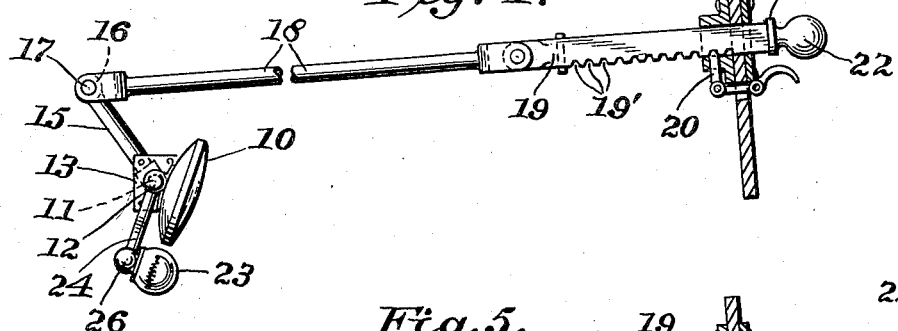
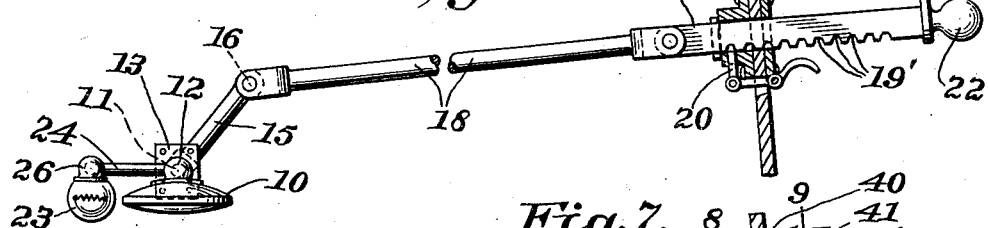
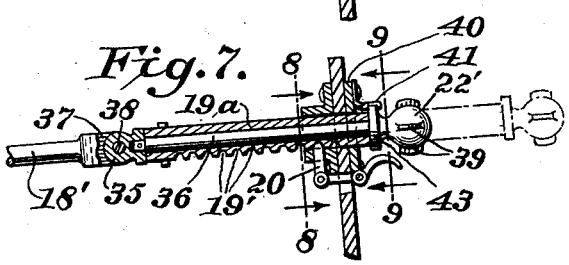
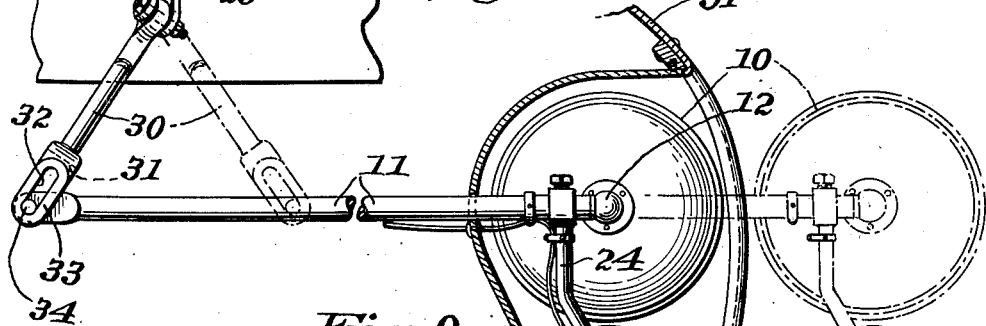
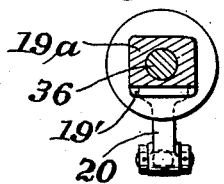
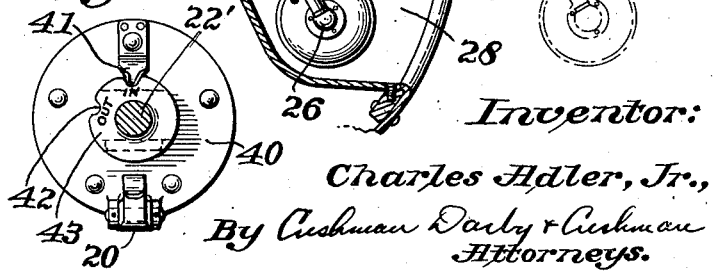
Inventor:
Charles Adler, Jr.,
By Cushman Darby & Cushman
Attorneys.

Patented July 11, 1944

2,353,380

UNITED STATES PATENT OFFICE 2,353,380

AIRCRAFT PRECISION FLIGHT INDICATOR

Charles Adler, Jr., Baltimore, Md.

Application January 18, 1944, Serial No. 518,754

1 Claim. (Cl. 88—93)

The present invention relates to an aircraft precision flight indicator which is useful in improving safety under a variety of conditions by informing the pilot in respect to his position when landing the aircraft, when taking off as well as when cruising in the air or taxiing on the landing surface.

The primary object of the invention is to provide an indicator, preferably in the form of a mirror, carried by the aircraft, which will simultaneously reflect the landing means and the landing surface and indicate the relation of the two. Thus the pilot without diversion from his line of vision forward, can determine the position of the landing gear with relation to the ground in order to ascertain when to level off in making a landing, and control the subsequent operation of the ship to make a precision landing. Moreover, in the case of retractable landing gear, the pilot can at all times observe the position of the same.

Another object of the invention is to associate with the mirror a suitable illumination means whereby in like manner the landing gear and landing surface are illuminated and rendered visible for night flying.

A further and equally important object of the invention is to provide a construction in which the mirror is movably mounted, whereby, (1) its position may be suitably adjusted to afford the pilot the desired view and, (2) the mirror may be moved to a position in which drag or wind resistance is appreciably reduced.

An additional object of the invention is to provide a construction which may be used for both day and night flying, to eliminate recognized hazards and otherwise substantially improve safety of operation both in the air and on the ground.

It is well known that pilots when landing an aircraft depend upon the personal factor of depth perception to determine when to level off and subsequently when to make contact with the ground. This dependence on depth perception in such a critical zone is not precise as evidenced by the fact that a pilot seldom can make two landings which are identical as to smoothness. The present invention overcomes this uncertainty and allows a pilot consistently to make uniform landings without difficulty.

Moreover, when landings are made in the face of the sun, conditions are aggravated. This hazard is eliminated by the provision of a convex mirror which faces generally downwardly and to the rear whereby the pilot is advised of the position of the landing gear with respect to the ground and can make an accurate landing by simply observing the reflection in the mirror.

When taking off from an airport it is customary for a pilot, upon reaching a height of 400 feet, to make a turn. In order to do so safely and without danger of collision with following aircraft, the pilot usually has to divert his vision rearward. With the present invention, this is obviated, since the mirror will act to reflect the presence of any following aircraft.

Also, when coming in for a landing and flying parallel with the landing field a pilot at the height of 800 feet closes the throttle and shortly thereafter makes a 90 degree turn. When opposite the runway upon which he desires to land, another 90 degree turn is usually made placing the ship in line with the runway. In making these turns the pilot's vision rearwardly is often obscured by the wings being banked on the turns. In order to provide the pilot with the necessary vision of other ships about to land at the airport, the present invention provides the necessary vision rearwardly to prevent collision.

When the ship is on the ground in position for take-off the present invention will provide the means for the pilot to observe any incoming ships who have right of way without either diverting his vision from the runway ahead or, as is sometimes done, when the rear vision is obscured by the construction of the ship, rotating the ship to make his observation.

Also, when taxiing along the runway and making a turn toward the airport buildings, which is standard practice, the present invention will inform the pilot of the presence of any following ships he might cut off, without the necessity of his looking around and thereby diverting his attention.

The present invention is useful when flying over and landing upon varying terrain, i. e., land and water.

In the accompanying drawings I have illustrated the invention in association with a land based aircraft and while it is preferable to include an illuminating means with the mirror for night flying, it is to be understood that in some cases the mirror alone will be employed as for example on aircraft not equipped with batteries, or used solely for daylight flying.

Referring to the drawings:

Figure 1 is a side elevation of an aircraft having the mirror located on the nose, i. e., externally of the body of the aircraft and in the direct line of vision of the pilot. It is to be understood that with some aircraft which are not provided with a nose, the mirror will be carried externally thereby in a suitable location so that it will always be in the line of vision of the pilot, as for instance in the case of certain types of helicopters. This view also shows the position of the illuminating means. The mirror as above indicated will reflect not only the terrain as in my former patent, 2,316,751, April 20, 1943, but of equal importance the landing gear, e. g., a landing wheel or a float, or the lower surface of a flying boat. The illuminating means is located so as to illuminate the terrain as well as the landing gear of the aircraft so that the reflection at night conveyed by the mirror will permit the pilot to make a precise and safe landing.

Figure 2 is a front elevation showing the mirror and associated illuminating means with the means for carrying the unit.

Figure 3 is a rear view of the unit shown in Figure 2, illustrating in detail the means for carrying the mirror and the light, and the operating means for moving the mirror and light into any of its desired adjusted positions.

Figure 4 is a plan view in detail showing the mirror in operative position to give the desired reflection and also showing means for accurately adjusting the position of the mirror and locking it in any of its adjusted positions, e. g., to provide a rear and downward view to encompass in the reflection both the landing gear and the terrain simultaneously, or to provide simply a rear view.

Figure 5 shows the mirror in its feathered position, parallel to the line of flight where the drag or wind resistance is appreciably reduced from that obtaining when the mirror is in the operative position shown in Figure 4. In this connection, the mirror and light source may normally be housed in a recess countersunk, for example, in the nose of the ship or any other suitable location and moved outwardly to operative position when required, then moved back within the said recess where wind resistance will be appreciably reduced or substantially eliminated. (See Figure 6.)

Figure 6 is a sectional view showing the mirror and associated illuminating means disposed in a countersunk recess in the body of the aircraft from which it may be moved to operative position and retracted as desired.

Figure 7 is a detailed section similar to Figure 4 and showing the modified mechanism for operating the construction of Figure 6.

Figure 8 is an enlarged detail, taken on line 8—8 of Figure 7 showing a cross-section of the modified operating mechanism, and Figure 9 is a similarly enlarged detail, taken on line 9—9 of Figure 7 showing a cross-section illustrating one means of retaining the mirror operating mechanism in either one of its two adjusted positions, "in" or "out."

Referring to Figure 1, I have illustrated a conventional aircraft A having landing gear B, in this instance wheels, with which the present invention is associated. As pointed out above, the mirror, or the mirror and illuminating means are so positioned that in daylight the terrain and one landing wheel will be reflected in the mirror and at night the illuminating means will illuminate the terrain and one landing wheel so as to give a similar reflection. In this manner, dependence upon depth perception, which is not precise, is eliminated in favor of the accurate and uniform reflected view given by the mirror which simultaneously reflects at least the lower portion of a landing device of the aircraft and the ground immediately below the same as shown in Figure 1 and presents the image directly in the path of vision of the pilot whose aircraft is in the critical zone.

Referring to Figure 2, the mirror 10 is preferably of the convex type but may be plane, and is of such a size and so located as to reflect simultaneously the terrain and one landing wheel as indicated by the lines L.

The mirror 10, as shown in Figure 3, is carried by a shaft 11, to which it is connected by ball and socket joint 12, allowing for some movement or permanent adjustment of the mirror with respect to the shaft. The shaft 11 extends laterally through an opening a in the nose on the left hand side of the ship as shown in Figures 1, 2 and 3 and is mounted for rotation in suitable bearings 13 about a horizontal axis. At its end 14, within the nose the shaft is rigidly connected to a lever 15, which as shown in Figures 4 and 5, has its end 16 pivotally connected at 17 to a rod 18 extending parallel to the axis of the ship, and in turn rod 18 is pivotally connected to an operating bar 19. This operating bar 19 is provided with a plurality of teeth, 19' which are engaged and locked by a suitable spring dog 20, whereby the position of the mirror may be accurately adjusted and the mirror locked in the desired adjusted position. The end, 21, of the operating bar 19 is provided with any suitable type of handle 22.

Referring to Figures 2, 3, 4 and 5 a suitable illuminating means such as a lamp 23 may be associated with the mirror 10. This lamp is carried by a rod 24, connected at one end to the housing for the lamp by a suitable ball and socket joint 26 as shown. The lamp is mounted below the mirror in a position to illuminate the terrain and one landing wheel simultaneously. The opposite end of the supporting rod 24 is adjustably and rigidly connected to the shaft 11 at 27, so that the mirror and lamp are simultaneously moved to operative position and retracted position.

By reason of the adjustable mounting, the mirror and also the lamp may be properly positioned to allow observation in the direct line of vision of the pilot of the reflection of the terrain and one landing wheel or so much of the rear as may be required for safe control of the ship whether in flight or on the ground and by day or night.

In Figure 5, the unit is shown in its retracted or feathered position and to move the mirror or mirror and lamp, to operative position as shown in Figure 4, the pilot simply releases the dog 20 and pushes forward on the handle 22. In this manner, the shaft 11 is rotated to appropriately locate the mirror or mirror and lamp as shown in Figure 1, whereupon the dog is again locked in one of the notches 19'. To retract the indicator, the dog is released and the handle pulled back as in Figure 5 whereupon the dog is engaged in another notch to hold the unit in its feathered position.

In the construction shown in Figures 6 to 9, a compound lever system is employed for (1) moving the mirror or mirror and associated lamp out of and back into the countersunk recess 28 preferably located in the nose of the ship, and (2) adjusting the mirror or the mirror and lamp to any one of the required outward positions.

Referring to Figures 6 and 7, the rod 18' has fixed thereto a yoke 29, in which is pivotally connected the link 30. The opposite end of the link 30 is also bifurcated as indicated at 31 and the bifurcated portions are each slotted as shown at 32. The shaft 11 which carries the mirror, or mirror and lamp, as previously described, is received between the ears 33 of the bifurcations and carries an operating pin 34 which engages slidably within the slots 32.

The opposite end of the rod 18', as shown in Figure 7, is pivotally connected to the enlarged detachable end portion 35 of an elongated stem 36 mounted for rotation within a squared or non-circular sleeve 19a, as shown in Figure 8. The rod 18' is bifurcated as at 37 to receive the end 35 and the two are pivotally connected by a pin 38.

The handle 22' carried by the stem has finger pieces or projections 39 as shown in Figure 7 to allow the handle to be firmly grasped for rotating or turning the stem 36 whereby the link connected thereto is moved laterally relative to the rod 18', as shown in Figure 6 and moves the mirror shaft 11 outwardly as also shown in Figure 6 to locate the mirror or mirror and lamp in operative position out of the recess 28. When so moved out of the recess 28, the mirror may not require further adjustment. If adjustment is necessary, or desired, the handle 22' is pulled outwardly as shown in dotted lines in Figure 7 or pushed in, the dog 20 being released and locked with one of the teeth 19' on the sleeve 19a, in the manner previously described to fix the unit in any of its adjusted positions. To return the unit within the recess 28, the handle 22' is turned in the reverse direction, or pushed in or pulled out if adjustment has been necessary and then turned.

Referring to Figure 9, a collar 40 fixed, for instance, to the instrument panel carries a spring detent 41. This detent engages in one or another of the recesses 42 in the periphery of a flange 43 on the handle 22'. In this manner, the stem and, consequently, the mirror unit is fixed in either its "in" or "out" position with respect to the recess 28.

It will be observed that in each of the constructions described, the mirror, or mirror and lamp is movable to operative position and further movable to a position where drag or wind resistance is appreciably reduced. Also, in each of the constructions, the mirror is located to reflect the terrain and landing means without requiring the pilot to divert his vision and the construction is operable for day or night flying.

I claim:

In an aircraft, means for permitting a pilot whose aircraft is in the critical zone of about to make contact with the ground to determine the position of the landing gear with relation to the ground immediately below without diversion of his line of vision forward whereby the pilot is able to so control subsequent operation of the aircraft as to make a precision landing, said means comprising a mirror carried by the aircraft externally of the cockpit and forwardly thereof, means operable by the pilot in said cockpit for moving said mirror to a position directed downwardly and rearwardly with relation to the aircraft in which position it will simultaneously reflect at least the lower portion of a landing device and the ground immediately below the same and present the image directly in the path of vision of the pilot whose aircraft is about to make contact with the ground thereby allowing him to concentrate his eyes ahead and upon the landing field when in said critical zone, said means for moving the mirror being operable to move the same to a position to reduce aerodynamic drag, and means for retaining the mirror in either of said positions.

CHARLES ADLER, JR.